Dec. 3, 1968    D. H. GORDON    3,413,783
ROTARY POWER MOWER
Filed Sept. 22, 1965    2 Sheets-Sheet 1
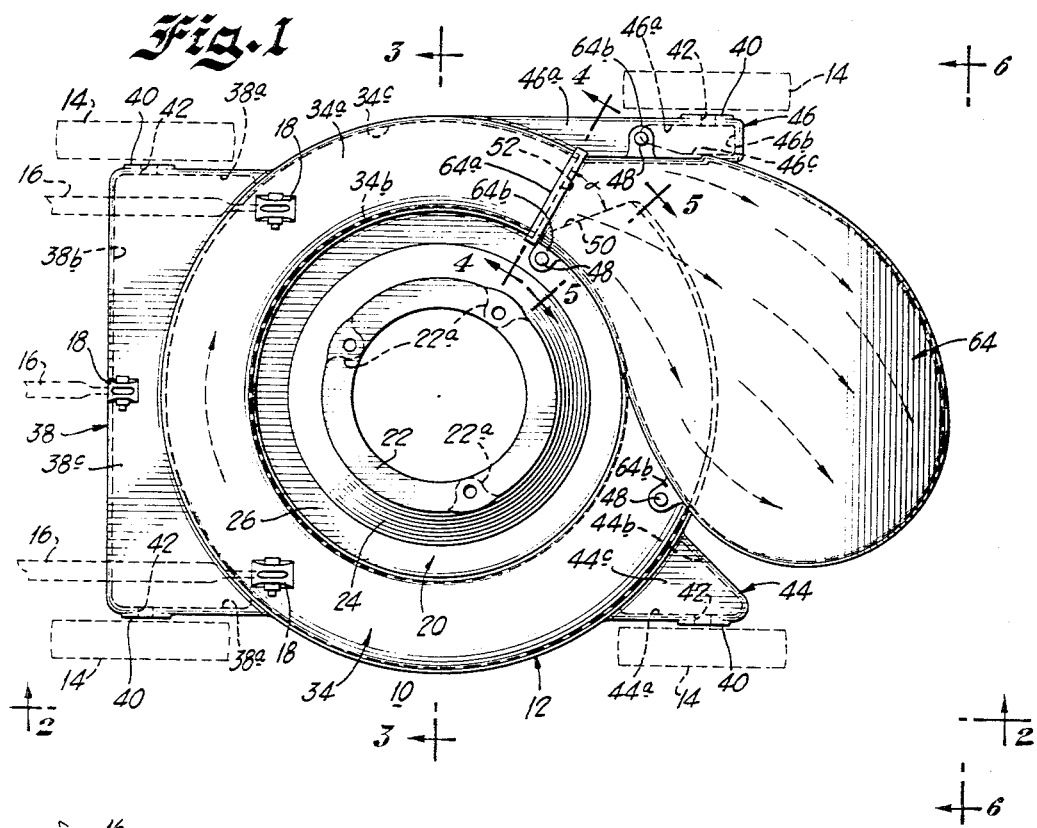
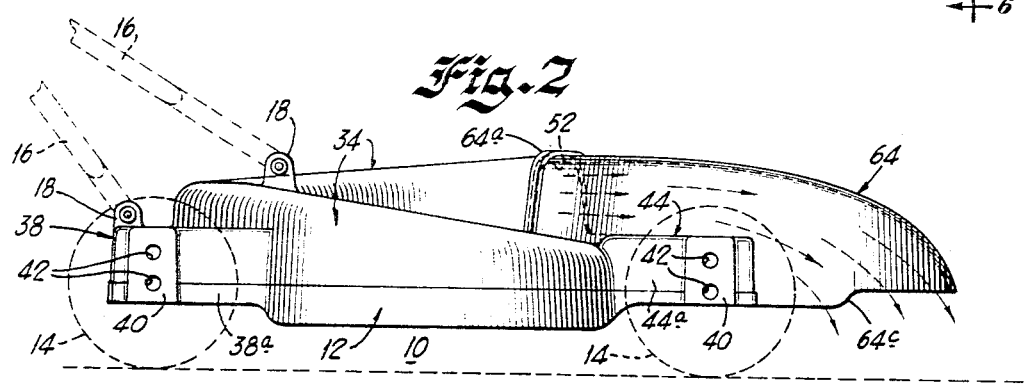
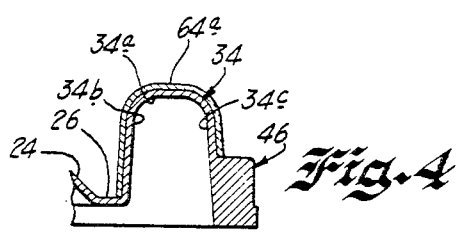
INVENTOR
DONALD H. GORDON
by Mason, Kolehmainen, Rathburn and Wyss
ATTORNEYS.

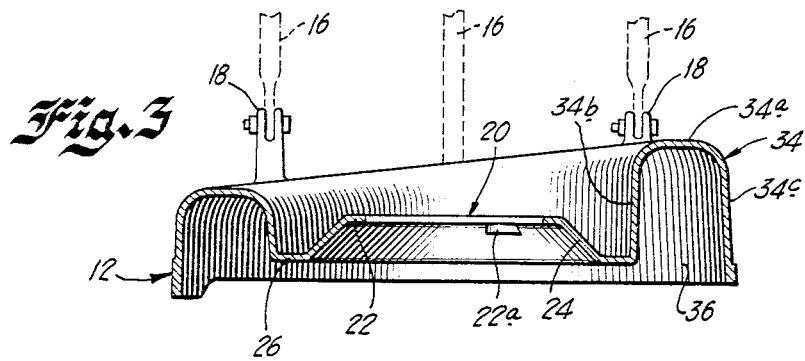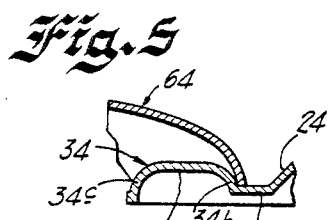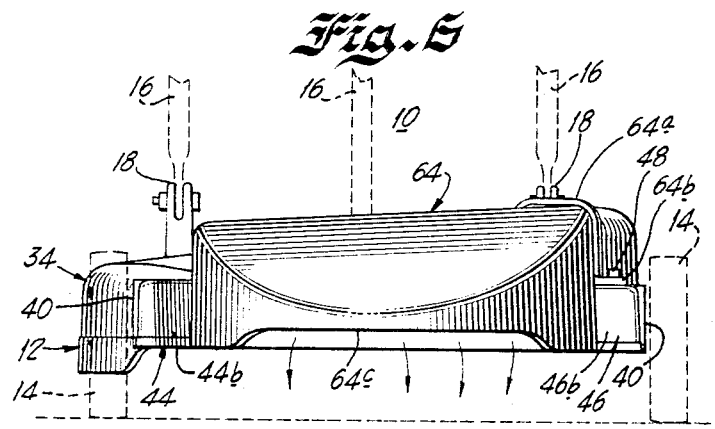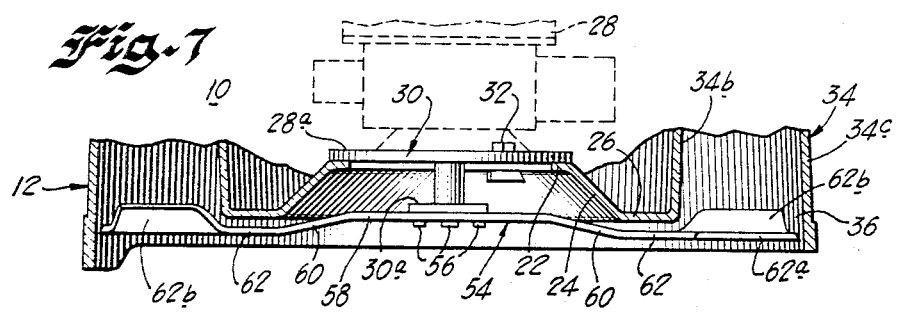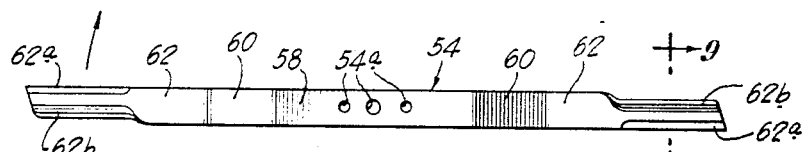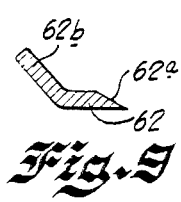
INVENTOR
DONALD H. GORDON

United States Patent Office 3,413,783
Patented Dec. 3, 1968

3,413,783
ROTARY POWER MOWER
Donald H. Gordon, Waynesboro, Va., assignor to Virginia Metalcrafters, Incorporated, Waynesboro, Va., a corporation of Virginia
Filed Sept. 22, 1965, Ser. No. 489,216
10 Claims. (Cl. 56—25.4)

ABSTRACT OF THE DISCLOSURE

A rotary power mower is provided having an upwardly spiraling channel for discharging vegetation cuttings forwardly of the motor in which the inlet of the channel lies ahead of and in angular offset relation to the outlet so that cuttings flowing through the outlet are freely discharged above and substantially over the inlet without plugging the outlet and without discharge of the cuttings into the inlet.

---

The present invention relates to rotary power mowers and, more particularly, to a new and improved power mower adapted for cutting vegetation and discharging the cut vegetation directly ahead of the mower so that the cuttings will be picged up again and remulched as the mower is moved along.

One of the primary disadvantages in many previous types of rotary mowers is the problem of unsightly vegetation cuttings being deposited in streaks or clumps on the surface of the finished lawn. These deposits are not only unsightly but, in many instances, tend to kill the vegetation underneath if allowed to remain.

Another disadvantage in many prior rotary mowers is the problem of clogging or plugging on the underside of the mower housing when wet and moist vegetation is being mowed. In many instances, the accumulation of moist vegetation renders it impossible to continue mowing until the accumulation on the mower housing are removed.

Accordingly, it is an object of the present invention to provide a new and improved rotary mower which is not subject to the aforementioned disadvantages.

More specifically, it is an object of the present invention to provide a new and improved rotary mower adapted to pick up the vegetation cuttings and discharge them forwardly of the mower in the path thereof in order that remulching of the cuttings will be accomplished as the mower passes along a path.

Another object of the present invention is the provision of a new and improved rotary mower having a forwardly extending discharge hood for distributing the vegetation cuttings uniformly in front of the mower.

Yet another object of the present invention is to provide a new and improved rotary mower having a new and improved housing means formed to direct the vegetation cuttings forwardly into a discharge hood without clogging or plugging the underside of the mower.

Many other objects and advantages are accomplished by the present invention and will become apparent as the following description ensures.

Briefly, a preferred embodiment of the present invention comprises a rotary mower having a housing with an open bottom, a cutting member mounted for rotation about a central axis in the housing, and discharge hood means extending forwardly of the housing for discharging cut vegetation ahead of the mower. The housing includes an inner central portion and an outer inverted channel or chute extending around the perimeter thereof. The channel is formed with a top wall and sidewalls and has an open bottom defining an annular cutting zone around the central portion. The channel increases in cross-sectional area from a minimum at the inlet thereof to a maximum at the outlet thereof adjacent the front of the housing. The inlet and outlet are arranged in angular and vertically offset relation to one another so that the vegetation cuttings moving forwardly through the outlet are discharged above the adjacent inlet and angularly with respect thereto so that there will be no plugging or clogging in this region. The cutting member includes one or more advancing cutting edges movable around the annular cutting zone to cut the vegetation and upwardly extending fan means is formed behind the cutting edges for deflecting the cut vegetation upwardly into the channel and producing an airstream around the channel to move the cuttings therethrough. The discharge hood means is in communication with the forward outlet of the channel and includes a forward wall portion for deflecting the cuttings as they are discharged through the outlet downwardly into the region just ahead of the mower housing. As the mower moves along a path, the cuttings that have discharged ahead of the mower are picked up for recutting into particles fine enough to be evenly dispersed and distributed by the discharge hood on the finished lawn without producing windrows, large clumps, or deposits which would damage the lawn or be unsightly.

For a better understanding of the present invention, reference should be had to the following detailed description and claims taken in conjunction with the drawings in which:

FIG. 1 is a top plan view of a rotary mower constructed in accordance with the present invention;

FIG. 2 is a side elevational view looking in the direction of the arrows 2—2 of FIG. 1;

FIG. 3 is a transverse sectional view taken substantially along the line 3—3 of FIG. 1;

FIG. 4 is a fragmentary sectional view taken substantially along line 4—4 of FIG. 1;

FIG. 5 is a fragmentary sectional view taken substantially along line 5—5 of FIG. 1;

FIG. 6 is a front elevational view looking in the direction of the arrow 6—6 of FIG. 1;

FIG. 7 is a transverse sectional view similar to FIG. 3 but illustrating the arrangement of the mower housing and cutting blade of the present invention;

FIG. 8 is a top plan view of the cutting blade of FIG. 7; and

FIG. 9 is a transverse sectional view taken substantially along line 9—9 of FIG. 8.

Referring now to the drawings, a rotary power mower constructed in accordance with the present invention is generally designated by the reference character 10. The mower 10 includes a main housing 12 having an open bottom and adapted to be supported for movement above the surface of the ground by a plurality of wheels 14 (shown in dotted lines, FIG. 1, 2, and 6). Movement of the housing along the ground is effected by handles 16 (shown in dotted lines, FIGS. 1, 2, 3, and 6), which are pivotally secured to upstanding lug 18 formed on the top of the housing.

The housing 12 includes a circular, inner central section 20 having a cross section similar to an inverted pie pan and including an upper, inwardly extending annular flange 22, an outwardly and downwardly sloping frustoconical sidewall or skirt 24 and an outwardly extending bottom wall or flange 26. The upper flange 22 serves as a mounting base for a drive engine 28 (FIG. 7) having a vertical output shaft 30 which extends downwardly in axial alignment with the central axis of the housing. The engine 28 includes a circular base 28a adapted to overlie and close the central opening in the upper flange 22, and the engine base is secured to the upper flange by a plurality of bolts 32 which extend downwardly through the flange into bosses 22a formed on the underside thereof and having threaded bores to receive the bolts.

The housing 12 is provided with an outer, inverted channel or chute 34 which extends around the perimeter of the central section 20 and, preferably, is integrally formed therewith as by casting. The channel is of inverted, U-shaped cross section and includes a top wall 34a, an inner sidewall 34b, and an outer sidewall 34c. Preferably, the inner sidewall 34b is integrally joined to the outer edge of the lower flange 26 of the central section 20, and the outer sidewall 34c extends downwardly below the junction of the inner sidewall and the flange (FIGS. 3, 4, 5, and 7) to provide an annular cutting zone 36 (FIG. 3) between the inner and outer sidewall around the central section.

In order to support the rear (left-hand in FIGS. 1 and 2) wheels 14, the housing 12 is formed with a rearwardly extending wheel support section 38 which is integrally joined with a portion of the outer sidewall 34c of the channel 34. The support section 38 includes a pair of sidewalls 38a, a rear wall 38b, and a top wall or cover 38c. The sidewalls 38a are formed with outer flatted mounting surfaces 40 thereon and a pair of vertically spaced, threaded openings 42 in order that wheel support members (not shown) can be secured thereto to support the wheels.

The forward (right-hand in FIGS. 1 and 2) wheels 14 are supported by a pair of forwardly projecting wheel support sections 44 and 46. The support section 44 is triangularly shaped (FIG. 1) and includes an outer sidewall 44a, an inwardly extending sidewall 44b, and a top wall or cover 44c. The outer sidewall 44a is in alignment with one of the sidewalls 38a (lower one in FIG. 1) on the rear wheel supporting section 38 so that the front and rear wheels on one side of the mower are in alignment. The sidewall 44a is formed with an outer flatted mounting surface 40 and a pair of vertically spaced, threaded openings 42 similar to the ones on the sidewalls 38a for securing suitable wheel support members. Preferably, the walls of the support section 44 are integrally formed and are integrally joined to the outer sidewall 34c of the channel 34.

The support section 46 is different in shape from the section 44 and includes an outer sidewall 46a which projects tangentially forward from an outer midpoint on the sidewall 34c of the channel (FIG. 1). The sidewall 46a is outwardly offset from the corresponding side face 38a on the rear section 38 so that the forward wheel on this side of the mower is outward of the cutting path thereof. The support section includes a forward wall 46b, an inner sidewall 46c, and a top wall 46d, all integrally formed and integrally joined to the sidewall 34c of the channel. The sidewall 46a includes an outer flatted mounting surface 40 and a pair of vertically spaced threaded openings 42 similar to the ones on the other wheel support section sidewalls for holding a wheel support member not shown. As viewed in FIGS. 1 and 4, a rearward portion of the support section 46 is solid, leaving a relatively small, hollow portion up front, adjacent the outer flatted section 40, and the solid portion is provided with a vertical, threaded bore 48 to receive a mounting bolt for securing a forward discharge hood to the housing, as will be described later in more detail.

The outer channel or chute 34 includes an open inlet end 50 and extends around the periphery of the central section 20 for a full 360 degrees, terminating in a forwardly opening discharge outlet 52. The inlet 50 has a minimum cross-sectional area (FIG. 5) and the cross section of the channel gradually and continuously increases to a maximum at the discharge outlet 52 (FIG. 4). Preferably, the width of the channel or distance between the sidewalls 34b and 34c is constant and the increase in cross-sectional area is accomplished by the upward slope or spiraling of the top wall 34a. Because of the increasing elevation of the top wall 34a as it progresses around the housing from the inlet 50 to the outlet 52, most of the cross-sectional area of the outlet is above the top wall 34a at the inlet 50. It should also be noted that the outlet 52 lies along a generally radial plane extending through the central axis of the housing, and the inlet 50 is angularly offset therefrom by an angle α. Accordingly, because of the difference in levels and the angular offset between the inlet and outlet of the channel, there is very little chance that the vegetation cuttings flowing forwardly through the outlet 52 will impinge and collect on the inlet end 50. The angular disposition between the inlet and outlet permits the vegetation cuttings to be guided around the housing for a full 360 degrees and yet relieves the tendency for plugging and clogging to occur in the region between, or adjacent, the juncture of the inlet and outlet. Because the outlet is much greater in height than the inlet, most of the discharged vegetation cuttings pass over and above the inlet and there is little tendency for the cuttings to be recirculated by passing from the discharge outlet back into the inlet.

In order to cut the upstanding vegetation under the moving mower housing 12, a rotary cutting member 54 is mounted on the lower end of the engine shaft 30 and is secured to an enlarged end flange 30a thereof by a plurality of mounting bolts 56 which extend through aligned holes 54a in the cutting member. The cutting member is formed from a length of flat, metal strip and includes an upper central section 58, a pair of intermediate, downwardly and outwardly extending portions 60 at opposite ends of the central section, and a pair of outer end portions 62 extending horizontally outwardly from the outer ends of the intermediate portions 60 into the annular cutting zone 36 in the mower housing.

Each outer end portion 62 includes a sharpened, leading cutting edge 62a which extends inwardly from the outer tip of the cutting member along the advancing edge thereof to a point adjacent the inner wall 34b of the channel within the annular cutting zone 36. Behind each cutting edge 62a of the cutting member along the trailing edge thereof, there is provided an angularly upwardly extending fan blade or vane portion 62b. The vanes 62b protrude protrude upwardly into the chanel 34 betwen the sidewalls and adobve the lower flange 26 of the central section 20.

As the blade member 54 is rotated by the engine shaft 30 in a clockwise direction around the housing (FIG. 1), the leading cuting edges 62a engage and cut the upstanding vegetation in the cutting zone 36 of the channel section 34. The vebetation cuttings are deflected upwardly into the upper portion of the channel 34 by the blades or vanes 62b which create a clockwise flow of air around the channel from the inlet 50 to the outlet.

The airflow in the channel 34 carries along the vegetation cuttings and discharge them in a concentrated scream forwardly through the outlet 52. Most of the cutting action is accomplished by the moving cutting edges 62a, as the outer ends 62 move through the forward half of the channel. Thus, as each cutting edge 62a moves clockwise from a point ahead of the inlet 50 to a point midway along the side of the channel 34, fresh cuttings are introduced into the channel and carried along in the airstream therein produced by the fan blade portions or vanes 62b. The top 34a of the channel spirals gradually upward to take care of the greater quantity of cuttings added as the cutting edges move around the housing. The airstream that carries the vegetation cutings around the housing is gradually elevated upwardly so that in effect a suction or lifting action is created which tends to straighten up the vegetation on the ground so that it can be effectively cut and additional cuttings, which are present in the vegetation on the ground, may be sucked up or down upwardly into the path of the cutting edges for further cutting and mulching action.

The gradually upwardly spiraling channel 34, in conjunction with the fan blade or vanes 62b on the rotary cutter 54, forms an effective means for lifting the cut vegetation upwardly for recutting and mulching and carrying the freshly cut vegetation around the channel for discharge through the outlet 52. As the vegetation traverses around the channel 34 from inlet 50 to outlet 52, it is subjected to repeated cutting by the member 54 and becomes finely divided into small particles which can be easily dispersed and distributed. It should also be noted that there are no rapid or abrupt directional changes around the channel 34, and the top wall 34a and sidewalls 34b and 34c blend smoothly into one another so that there is little or no chance for accumulation of chunks or clumps of cut vegetation under the housing 12. Even when wet and moist vegetation is mowed by the apparatus of the present invention, there is very little tendency for the cut vegetation to collect and clog the underside of the housing because of the smooth, gradual lifting action and blending of top and sidewalls of the channel in addition to the angular offset relation between the channel inlet and outlet, as previously described.

In order to provide for distribution of the vegetation cuttings in front of the mower housing 12, the discharge outlet 52 of the channel 34 is in direct communication with the throat or rearward end 64a of a forwardly extending discharge hood 64. The discharge hood 64 is somewhat tear-drop shaped in plan view (FIG. 1) and extends forwardly of the housing and generally across the forward end thereof. The hood is open on the bottom and is secured in place on the mower housing by lugs 64b and suitable cap screws which extend through the lugs into threaded apertures in the housing, one of which is the aperture 48 previously referred to. The forward end of the discharge hood is surved downwardly to deflect the cuttings and possibly other foreign objects downwardly into the path of the mower.

The cuttings are thus distributed ahead of the mower housing and across its path so that many of these cuttings will be picked up and remulched as the mower moves along. This continuous remulching action results in the cuttings being finely chopped so that they are easily dispersed in the vegetation and produced no unsightly clumps or windrows. The discharge hood 64 also serves as a safety device in preventing foreign objects picked up by the mower from being hurled forwardly of the mower at high velocity. As illustrated in FIGS. 2 and 6, the lower edge of the forward end of the discharge hood is elevated sligtly, as at 64c, to prevent the leading edge of the hood from deflecting the upstanding vegetation ahead of the mower too far downwardly, so that effective cutting action in the zone 36 will be hampered.

From the foregoing, it can be seen that the mower of the present invention provides many advantages over mowers previously known. The mower of the present invention effectively eliminates the depositing of windows or clumps of vegetation cuttings on the finished lawn. In addition, the forward discharge hood provides for remulching of the cuttings and even distribution of them in a finely divided condition on the vegetation, as well as provides a safety hood preventing the forward discharge of objects, such as rocks and the like. The mower can be used in wet and moist vegetation without plugging or clogging up by accumulated cuttings under the housing.

While there has been illustrated and described a single embodiment of the present invention, it will be appreciated that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. A rotary mower for cutting vegetation comprising a housing and a cutting member mounted for rotation about a central axis in said housing, said housing including an inner central portion and an outer inverted channel extending around the perimeter thereof, said channel having a top wall and sidewalls, and an open bottom defining an annular cutting zone around said central portion, and increasing cross-sectional area through less than 360° from an inlet to an outlet adjacent the front of said housing, said inlet lying ahead of and in angular offset relation to the outlet, whereby vegetation cuttings flowing forwardly in said channel through said outlet are discharged above said inlet and angularly thereto, said cutting member including an advancing cutting edge movable around said cutting zone and an upwardly extending fan means behind said edge for deflecting said vegetation cuttings upwardly and moving said cuttings around said channel for discharge through said outlet.

2. The mower of claim 1 wherein said top wall of said channel gradually and continuously rises from said inlet to said outlet and is discontinuous between said inlet and outlet forming an angular open area therebetween.

3. The mower of claim 2 including a discharge hood extending forwardly of and in communication with said outlet of said channel, said hood including a top wall overlying said angular open area and extending forwardly of said housing for discharging said vegetation cuttings ahead of said mower.

4. The mower of claim 3 wherein the top wall of said discharge hood is sloped downwardly along a forward periphery to deflect said vegetation cuttings downwardly into the uncut vegetation.

5. A rotary mower for cutting vegetation comprising a housing having an open bottom, a cutting member mounted for rotation about a central axis in said housing, said housing including an inner central portion and an outer inverted channel extending around the perimeter thereof, said channel having a top wall and sidewalls, and an open bottom defining an annular cutting zone around said central portion, and increasing in cross-sectional area through less than 360° from an inlet to an outlet adjacent the front of the housing to dispose the top wall of said outlet above the top wall of said inlet, said inlet lying ahead of and in angular offset relation to the outlet in which the angle of offset is an acute angle, whereby vegetation cuttings flowing forwardly in said channel through said outlet are discharged above and substantially over said inlet and angularly thereto, said cutting member including an advancing cutting edge movable around said cutting zone and an upwardly extending fan means behind said edge for deflecting said vegetation cuttings upwardly and moving said cuttings around said channel for discharge through said outlet, and discharge hood means in communication with said outlet and extending forwardly of said housing, said hood means including a forward wall for deflecting said cuttings downwardly into said vegetation.

6. The mower of claim 5 wherein said discharge hood means extends transversely along the forward edge of said housing to distribute the cuttings from said outlet across the path ahead of said mower.

7. The mower of claim 6 wherein a portion of said discharge hood means overlies a portion of said channel adjacent said inlet.

8. The mower of claim 5 wherein the forward wall means of said discharge hood means includes a recessed portion above the lower level of the sidewalls of said channel.

9. A rotary mower for cutting vegetation comprising a housing, a cutting member mounted for rotation about a central axis in said housing, said housing including an inner central portion and an outer inverted channel extending around the perimeter thereof, said channel having a top wall and sidewalls, and an open bottom defining an annular cutting zone around said central portion, and increasing in cross-sectional area through less than 360° from an inlet to an outlet adjacent the front of the housing to dispose the top wall of said outlet above the top wall of said inlet, said inlet lying ahead of and in angular offset relation to the outlet in which the angle of offset is an acute angle, whereby vegetation cuttings flowing forwardly in said channel through said outlet are discharged above and substantially over said inlet and angularly thereto, said cutting member including an advancing cutting edge movable around said cutting zone and an angularly, upwardly extending fan member behind said edge for deflecting said vegetation cuttings upwardly and moving said cuttings around said channel for discharge through said outlet, and discharge hood means extending forwardly from said outlet and transversely along the forward end of said housing for deflecting said cuttings from said outlet into the vegetation ahead of said mower.

10. The mower of claim 9 wherein said discharge hood means is formed to enlarge outwardly of said outlet to a maximum width forwardly of said housing.

References Cited

UNITED STATES PATENTS

| 2,502,696 | 4/1950 | Barnes | 56—25.4 |
| 3,178,872 | 4/1965 | Swindler | 56—25.4 |
| 3,220,170 | 11/1965 | Smith et al. | 56—25.4 |

ABRAHAM G. STONE, *Primary Examiner.*

P. A. RAZZANO, *Assistant Examiner.*